March 31, 1936.  E. ANDERSON  2,035,937
SPRING CONSTRUCTIONS AND SPRING MOUNTINGS
Filed March 21, 1933  3 Sheets-Sheet 2
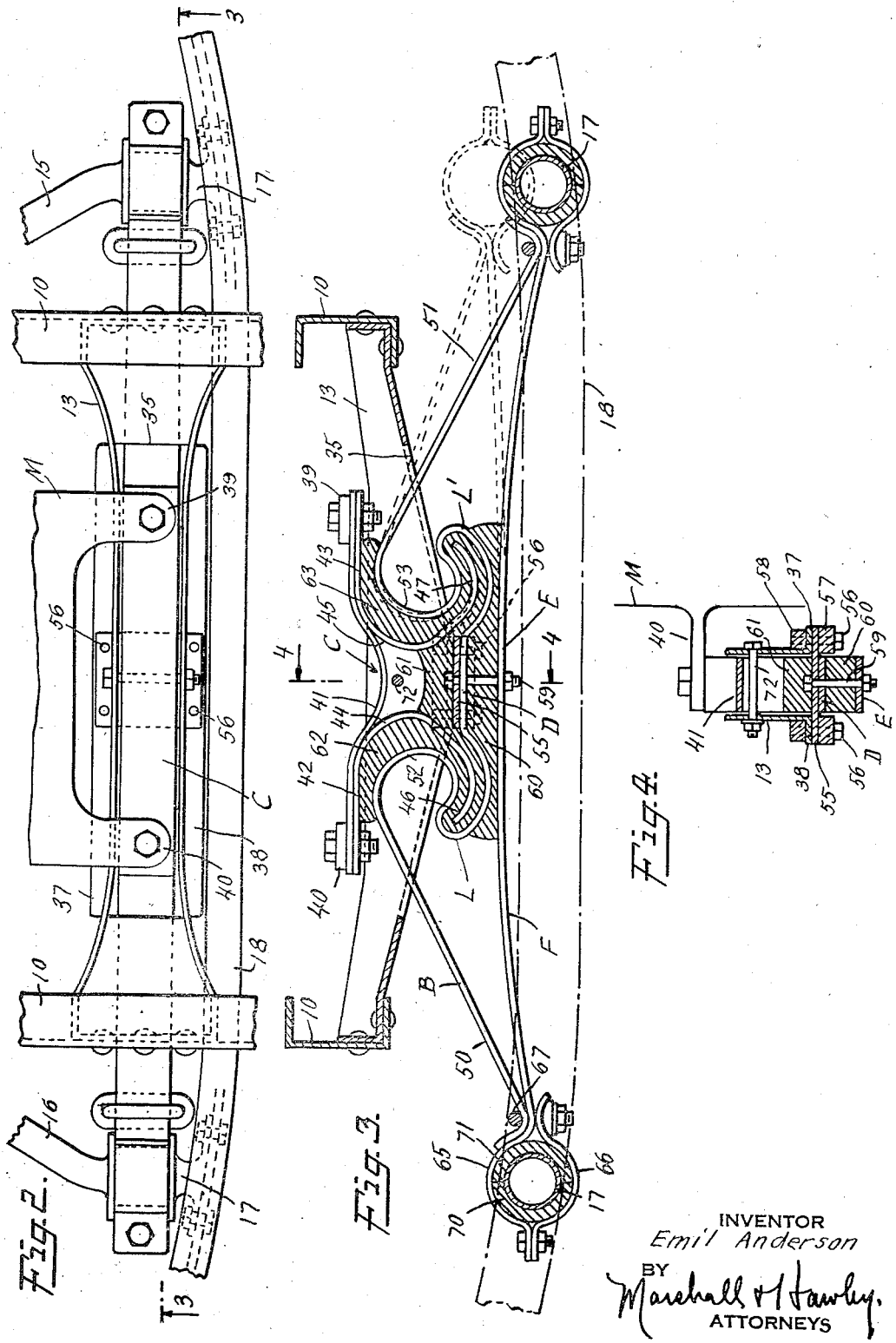
INVENTOR
Emil Anderson
BY
Marshall & Hawley
ATTORNEYS

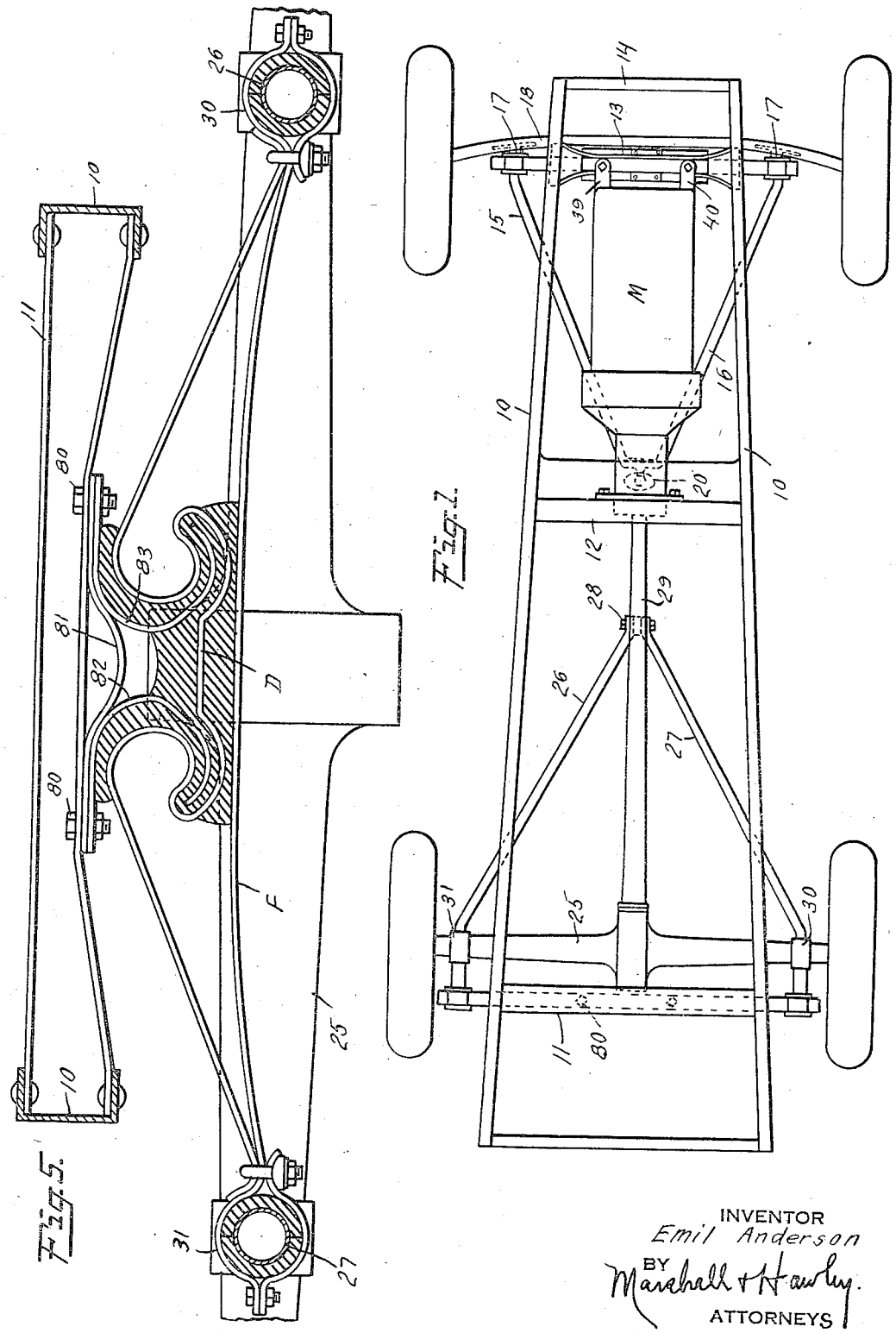

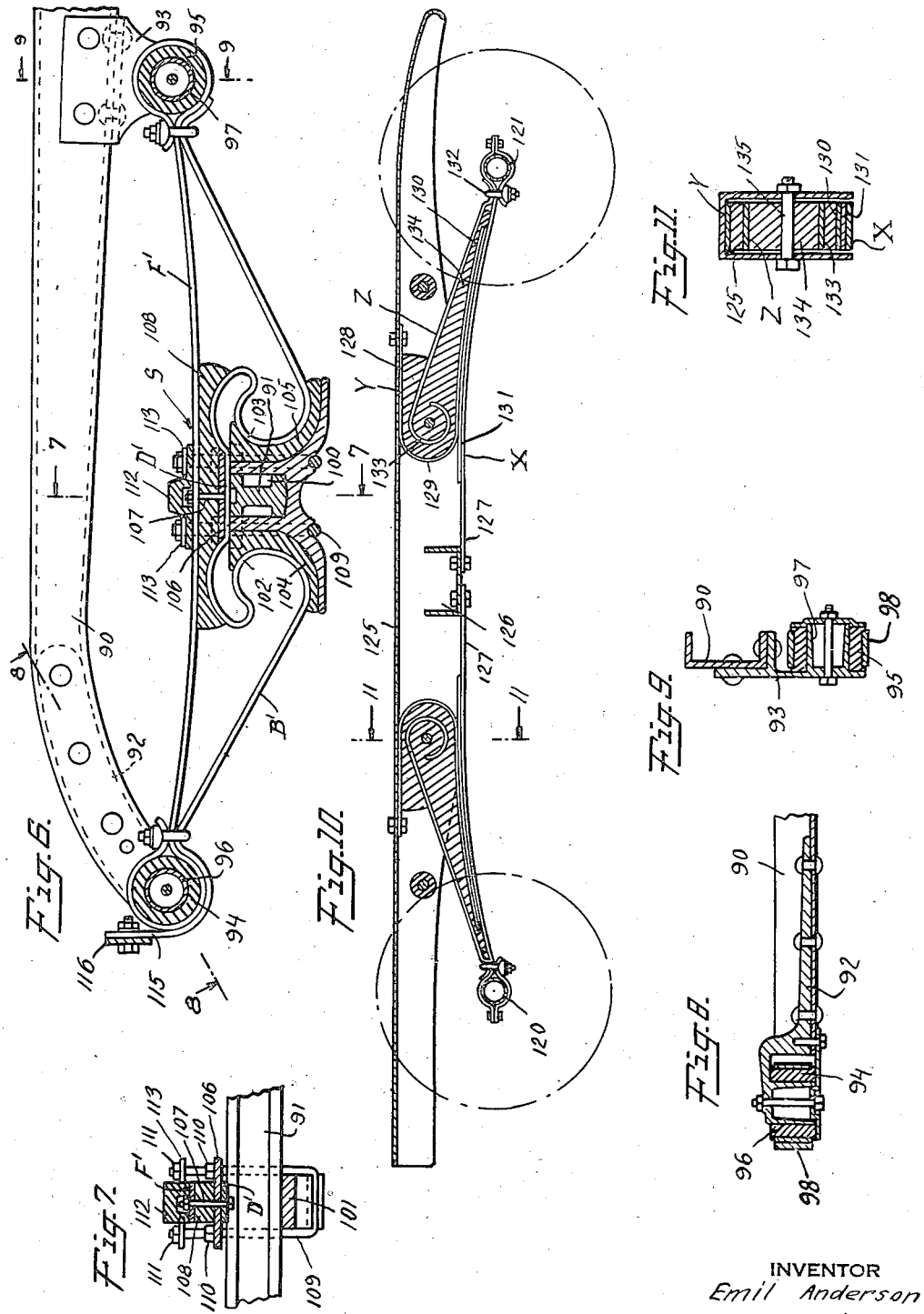

Patented Mar. 31, 1936

2,035,937

UNITED STATES PATENT OFFICE 2,035,937

SPRING CONSTRUCTIONS AND SPRING MOUNTINGS

Emil Anderson, Briarcliff Manor, N. Y.

Application March 21, 1933, Serial No. 661,882

23 Claims. (Cl. 180—64)

This invention relates to spring constructions and spring mountings and particularly to such structures adapted for use on motor vehicles.

The invention has been worked out both for engine mountings and for frame mountings. In most motor vehicles the engine casing or frame is mounted directly on the vehicle frame and thus all engine vibrations are transmitted to the frame of the vehicle. Efforts have been made to dampen or counteract such vibration by various forms of vibration absorbing mountings or vibration dampers, consisting usually of resilient or cushioning instrumentalities interposed between the engine casing and the frame. However, even when such devices are used the engine is still mounted on the frame and in spite of their use the frame receives an appreciable amount of vibration from the engine.

One of the objects of this invention is to provide an engine mounting so worked out that the engine vibrations will be absorbed and will not be transmited to the frame of the vehicle.

Another object of the invention is to provide a vehicle spring mounting so constructed and arranged that the movement of the vehicle chassis relative to the road surface on which the vehicle is traveling, due to uneven road conditions, will be checked and dampened in both directions obviating or eliminating the use of separate cushioning or shock absorbing devices, such as shock absorbers, snubbers, or the like.

Another object of the invention is to provide a spring construction and mounting so arranged that movement of one end of the spring will not be transmitted to the other end thereof, but will be checked at the central portion of the spring.

Another object of the invention is to provide a spring mounting for a vehicle frame or chassis and for the engine so constructed and arranged that one spring is utilized for both purposes and furthermore so arranged that engine vibrations will not be transmitted to the frame and the movement of the axle or wheels will not be communicated to the engine.

Another object of the invention is to provide a spring of the character described so constructed and arranged and so connected to the vehicle that the center of gravity of the vehicle supported thereby will be materially lowered.

Another object of the invention is to provide a spring structure adapted particularly for use as a transverse spring for supporting a vehicle and so constructed and arranged that relative movement of one-half of the spring will not be communicated to the other half.

Further objects of the invention will appear from the following specification taken in connection with the drawings which form a part of this application, and in which Fig. 1 is a top plan view of a vehicle frame or chassis showing front and rear spring mountings and a motor mounting constructed in accordance with the invention;

Fig. 2 is a plan view on an enlarged scale showing the mounting for the front end of the frame and for the motor or engine;

Fig. 3 is a sectional elevation of the construction shown in Fig. 2 and is taken substantially on line 3—3 of Fig. 2;

Fig. 4 is a sectional elevation taken substantially on line 4—4 of Fig. 3;

Fig. 5 is a sectional elevation similar to Fig. 3 but showing the spring mounting for the rear end of the frame;

Fig. 6 is a sectional elevation of the front end of the vehicle frame showing the invention worked out for another form of spring mounting;

Fig. 7 is a sectional elevation taken substantially on line 7—7 of Fig. 6;

Fig. 8 is a sectional elevation taken substantially on line 8—8 of Fig 6;

Fig. 9 is a sectional elevation taken substantially on line 9—9 of Fig. 6 and showing the connection between the rear end of the spring and the spring bracket carried by the frame;

Fig. 10 is a longitudinal sectional elevation illustrating the invention worked out for a cantilever spring construction; and Fig. 11 is a sectional elevation taken substantially on line 11—11 of Fig. 10.

The invention briefly described consists primarily of the combination of a motor vehicle frame, an axle, an engine and a spring having a connection to the frame and a separate connection to the engine casing. The connections are cushioned so as to absorb and retard relative movement between the connected parts in both directions and furthermore are so constructed and arranged that engine vibrations will not be transmitted to the vehicle frame and movements of the frame or axle will not be communicated to the engine. The spring is furthermore so constructed and so connected to the parts that movement of one end of the spring will not be transmitted to the other end. This gives, in effect, a cantilever spring connection.

Further details of the invention will appear from the following description.

In the particular embodiment of the invention illustrated in the drawings there is shown a motor vehicle frame comprising longitudinal frame members 10, 10 and transverse frame members 11, 12, 13, and 14. The invention has been illustrated in Figs. 1 to 5 inclusive, in connection with the Ford type of spring mounting, or in other words, in connection with the type of vehicle in which the vehicle frame or chassis are supported on transverse springs located at the front and rear ends of the vehicle.

Fig. 1 also illustrates radius rods 15 and 16 which are connected by brackets 17 to the front axle 18 which is transversely bowed and which are connected in the usual manner at their rear ends to a bracket 20 secured to the transverse frame member 12. The rear axle is shown at 25, and the rear radius rods at 26 and 27, these radius rods being connected at 28 to the housing 29 for the transmission shaft and being connected to the rear axle housing at 30 and 31.

The engine mounting and the mounting for the front end of the frame are shown particularly in Figs. 1 to 4 inclusive. The transverse frame member 13 is U-shaped in section and is open at the top, as shown in Figs. 2 and 3. The bottom of this frame member is cut away, as shown at 35, to permit the central portion C of the front spring to extend upwardly therethrough.

The central portion of the frame which is recessed at 35, as above stated, has the portions of the bottom thereof bent outwardly to form flanges 37 and 38, shown in Fig. 4. In other words, the material forming the flanges, in the usual construction of the transverse member, forms the central portion of the bottom thereof.

The front end of the motor casing M is provided with forwardly extending lugs 39 and 40 which are connected by a bar 41 and are bolted with the bar to laterally extending upper ends 42 and 43 of members 44 and 45 which form portions of the spring. These members are curved longitudinally, the lower ends being shown at 46 and 47. The rear end of casing M is pivoted to the cross frame member 12 in any suitable manner, not shown.

The spring also comprises an upper leaf B having laterally extending ends 50 and 51, curved portions 52 and 53 at the inner ends of the laterally extending end portions, the portions 52 and 53 extending to loops L and L' which are connected by a central portion D. A plate or bar 55 is secured to the flanges 37 and 38 by means of bolts 56 which extend through the flanges and through reinforcing bars or blocks 57 and 58. The central portion D of the spring leaf B is secured by a bolt 59 to the plate or bar 55 and thus to the frame 13. The bolt 59 also secures the central portion E of a lower leaf F of the spring to the plate or bar 55 and frame 13. The space between the central portion D and the loops L, L' and the lower leaf F is filled in with an elastic cushioning material such as a block 60 of rubber. A rubber block 61 is also positioned above the plate or bar 55 and between the side walls of the frame member 13.

Elastic cushioning material is also positioned, as shown in Fig. 3, in the loops L, L' and above the loops between the ends 42, 43 and the upper portions thereof. This material is shown at 62 and 63 in Fig. 3. It will also be noted that the ends 46 and 47 of the members 44 and 45 are embedded in the rubber or elastic material.

The outer ends of the spring members B and F are secured to the front end portions of the radius rods 15 and 16 in the manner shown particularly in Figs. 2 and 3. The spring leaf F is extended to form the upper half 65 of a clamp, the lower half of the clamp being shown at 66. The ends 50 and 51 of the upper leaf B are secured to these clamp members by means of a U bolt 67. Elastic cushioning material, such as rubber, is interposed between the clamps and the radius rods, this being shown in two half sections at 70 and 71 in Fig. 3. The front ends of the radius rods are bolted to the vertical portion of the front axle 18, as shown at 17, the axle preferably being of the usual I beam construction. It will also be understood that the outer ends of the spring could be, if desired, connected directly to the front axle instead of to the radius rods.

It will be understood that the spring leaf B may, if desired, be formed in sections instead of in a single piece, as shown in Fig. 3. The action of the spring is illustrated by the dotted line position shown at the right in Fig. 3. When the wheel which is connected to this end of the axle encounters an obstruction the axle will be tilted thus moving the outer end of the spring upwardly to a position such as that illustrated. When this takes place an inward thrust is placed on the portion 53 of the upper leaf F of the spring, thus compressing the elastic material 63 and causing this material to spread laterally. The lateral spreading movement of the material is limited by the side walls of the frame member 13 and can be controlled by adjusting the distance between the side walls in any suitable manner, as by a bolt 72.

Any engine vibration is absorbed in the spring by the shock absorbing material or rubber which is interposed between the engine support 42, 43 and the spring and between the ends 46, 47 of the members 44 and 45 and the other portions of the spring. Furthermore, movements of the spring due to the travel of the vehicle over an uneven road surface will be communicated to the vehicle frame only to a very small extent since these movements are checked and retarded by means of the loops 52 and 53 and the shock absorbing or cushioning material 60, 62, and 63. Further retarding is effected by the cushioning material 70, 71 interposed between the outer ends of the spring and the radius rods or axle.

It should also be noted that by reason of the loop construction and the particular form of the upper spring leaf B, the movement of one end of the spring is communicated only to a very small extent to the other end thereof. This gives, in effect, an independent spring action for the two ends of the axle.

Fig. 5 shows the mounting for the rear end of the frame in which the rear transverse frame member 11 is connected to the central portion of the spring by bolts 80 which engage a bar 81 and spring members 82 and 83 which are similar to the members 42 and 43 shown in Fig. 3. Elastic cushioning material is interposed between the members 82, 83 and the spring members in the same manner as in Fig. 3 and is also interposed between the central portion D of the spring and the bottom leaf F. Furthermore, the ends of the spring leaves are connected to the rear ends of the radius rods 26 and 27 in the same manner as the front spring is connected to the radius rods 15 and 16. It will be noted that the spring is located in the rear of the rear axle and that the front spring is located in the rear of the front axle or that the front axle is located in front of the front spring. These spring connections permit the lowering of the center of gravity of the vehicle.

Another embodiment of the invention is illustrated in Fig. 6 which shows the front end portion 90 of one of the side frames 10 and shows a spring S connected to the front axle 91 intermediate its ends and connected at its front end to a bracket 92 and at its rear end to a bracket 93 which are secured to the frame. The spring S is similar in construction to that shown in the preceding figures, but in this case the leaf F' which corresponds to the leaf F shown in Figs. 1 to 5 constitutes the top leaf of the spring and the leaf B' which corresponds to the leaf B forms the lower leaf of the spring. The ends of the leaves F" and B' are clamped around elastic sleeves 94 and 95 which surround cylindrical sleeves 96 and 97 formed on the brackets 92 and 93. Plates 98 are secured over the sleeves 96, 97 and over the rubber sleeves 94 and 95.

The axle 91 is seated in a recess 100 formed in a block 101 which is secured between the curved portions 102 and 103 of the leaf B' similar to the corresponding portions 52 and 53 of the leaf B shown in Fig. 3. Elastic inserts of rubber or like material are positioned between the curved portions 102, 103 and the block, as shown at 104 and 105. The block, as will be seen, is curved in a manner similar to the curved portions of the leaf B'.

The central portion D' of the spring S is secured to a plate or bar 106 and to the central portion of the leaf F" by means of a bolt 107, elastic cushioning material such as rubber 108 being interposed between the upper portion of the leaf B' and the end surface of the leaf F".

The block 101 is secured in position by means of U bolts 109 (see Fig. 7) which extend around the bottom and two sides of the block and are secured to the plate 106 and central portion D' of the leaf B' by means of nuts 110 and to the upper leaf by means of nuts 111. A rubber bumper 112 is disposed above the leaf F" and is positioned between plates 113 and the upper surface of the leaf.

The spring just described operates in a manner similar to that shown in Figs. 2 and 3 and when it is placed under compression the two ends of the lower leaf B' will be forced inwardly toward the axle, thus compressing the elastic cushioning material and retarding and dampening the movement of the axle relative to the frame. The elastic sleeves or bushings 94 and 95 also exert a retarding effect and dampen the movement of the spring.

In Fig. 6 the front end portion of the lower leaf is extended around the clamp and upwardly, as shown at 115, to form a support for the front bumper 116.

Fig. 10 illustrates the principle of the spring shown in the preceding figures as applied to a spring of the cantilever type. In this figure the front axle is shown at 120 and the rear axle at 121. The side frame 125 shown in Fig. 10 is U-shaped in section and open at the bottom, as shown in Fig. 11. The cross frame member 126 connects the two side frame members and has secured thereto one end 127 of the lower leaf X of a cantilever spring. One end 128 of a spring member Y is secured to the closed upper end of the side frame, this member Y being bent into a curve, as shown at 129, and extended as shown at 130 substantially parallel with the bottom spring member X. A strip 131 of antifriction material is interposed between the end 130 of the spring member Y and the upper surface of the lower spring member X.

A third spring member Z is secured at its outer end by a U bolt 132 to the bottom spring member X and by a clamp similar to that shown in Fig. 3 to the axle. The other end of the spring member Z is curved, as shown at 133. Elastic material such as rubber is interposed between the spring members Y and Z, as shown at 134, and is extended around the curved portion 133 of the member Z and between this portion and the curved portion 129 of the member Y. The elastic material is also between the upper portion of the member Z and the lower surface of the upper end 128 of the member Y. When the vehicle encounters an obstruction and the wheel is raised the elastic material will be compressed and distorted. The lateral movement of the elastic cushioning material is limited by the side walls of the frame member 125 and this can be controlled by means of a bolt 135.

From the foregoing description it will be seen that the spring structure and the mounting of the spring effectively absorbs shocks due to uneven road surface, retards the relative movement between the parts connected to the spring, absorbs engine vibrations and prevents the transmittal of such vibrations to the frame and the vehicle. The use of this spring construction eliminates the necessity for using separate shock absorbers and thus materially reduces the cost of the vehicle.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a motor vehicle frame, an axle, an engine casing, a spring, means including a clamp at each end of the spring connecting the spring to said axle and holding the spring ends against endwise movement relative thereto, a connection between said frame and the central portion of said spring, and a connection between said engine casing and said spring.

2. In combination, a pair of relatively movable members, a spring having central portions movable toward and away from each other and having its ends connected to one member in a manner to hold the ends of the spring against any material lengthwise movement of the spring relative to the said member, said spring having its central portion connected to the other member.

3. In combination, a pair of relatively movable members, a spring having its ends secured by clamps to one member and held thereby against lengthwise movement relative thereto and having its central portion connected to the other member, said spring having central portions movable toward and away from each other, and elastic cushioning material for cushioning and retarding said movement.

4. In combination, a vehicle frame, an axle and an engine casing, a spring comprising a lower leaf connected to the axle, an upper leaf connected to the frame, and members supported by the upper leaf but separated therefrom, connected to the engine casing, elastic shock absorbing material being interposed between the said members and the upper leaf.

5. In combination, a vehicle frame, an axle and an engine casing, a spring comprising a lower leaf connected to the axle, an upper leaf connected to the frame, and members supported by the upper leaf but separated therefrom, connected to the engine casing, elastic shock absorbing material being interposed between the said members and the upper leaf and between the spring leaves.

6. In combination, a vehicle frame, an axle and an engine casing, a spring comprising a lower leaf connected at its ends to the axle, an upper leaf connected to the lower leaf and frame, and members supported by the upper leaf but separated therefrom, connected to the engine casing, elastic shock absorbing material being interposed between the said members and the upper leaf and between the spring leaves.

7. In combination, a vehicle frame including side frame members and a cross frame member, an engine casing, an axle, a spring comprising an upper leaf and a lower leaf, said leaves being connected at their ends and the ends of the leaves being connected to the axle, means connecting the central portions of the leaves and the cross frame member, means supported by said spring and connected to said engine casing, and cushioning means between said supporting means and the spring.

8. In combination, a vehicle frame including side frame members and a cross frame member, an engine casing, an axle, a spring comprising an upper leaf and a lower leaf, said leaves being connected at their ends and the ends of the leaves being connected to the axle, means connecting the central portions of the leaves and the cross frame member, means supported by said spring and connected to said engine casing, and cushioning means between said supporting means and the spring and between said upper and lower leaves.

9. In combination, a vehicle frame, an axle, an engine casing, a spring mounted on and connected to the axle by clamps which hold the ends of the spring against longitudinal movement relative to the axle, means including shock absorbing elastic supporting means for connecting the engine casing to the spring, and means connecting the frame to the spring.

10. In combination, a vehicle frame, an axle, an engine casing, a spring mounted on and connected to the axle, said spring having loops therein, means including shock absorbing elastic supporting means disposed in said loops for connecting the engine casing to the spring, and means connecting the frame to the spring.

11. In combination, a vehicle frame, a spring comprising upper and lower leaves connected together at their outer ends, an axle, radius rods connected to the axle, means connecting the ends of the spring to said radius rods, and means connecting the central portions of said leaves to the frame.

12. In combination, a vehicle frame, a spring comprising upper and lower leaves connected together at their outer ends, an axle, radius rods connected to the axle, means including elastic cushioning means connecting the ends of the spring to said radius rods, and means connecting the central portions of said leaves to the frame.

13. In combination, a motor vehicle frame, an axle, an engine casing, a connection between one end of the engine casing and the frame, a spring clamped at its ends to the axle and held against longitudinal movement relative to the axle, said spring having central portions movable toward and away from each other, a connection between said frame and said spring, a connection between said casing and said spring, and cushioning material between the connections between the spring and the casing and frame.

14. In combination, a motor vehicle frame, an axle, an engine casing, a connection between the engine casing and frame, a spring clamped at its ends to the axle and held against endwise movement relative thereto, a connection between the engine casing and the central portion of the spring, a connection between the frame and the central portion of the spring, and cushioning material between said last two connections to the spring whereby relative movement is permitted between said connections.

15. In combination, a motor vehicle frame, an axle, an engine casing, a connection between one end of the casing and the frame, a spring clamped at its ends to said axle and held against endwise movement relative thereto, a cushioned connection between said frame and said spring and a cushioned connection between said engine casing and said spring, said last two connections being relatively movable with respect to each other.

16. In combination, a motor vehicle frame, an axle, an engine casing, a connection between one end of the casing and the frame, a spring clamped at its ends to said axle and held against endwise movement relative thereto, a connection between the frame and the spring and a connection between said engine casing and said spring, said last named connection including vibration absorbing material permitting relative movement between the frame connection to the spring and the casing connection to the spring.

17. A vehicle spring comprising a spring leaf arranged for connection to a vehicle chassis, a second spring leaf rigidly connected to said leaf, and elastic, non-metallic, shock absorbing and distributing material disposed between and engaging said leaves, one of said leaves having loops therein extending toward the other leaf, said elastic material being connected to said leaves.

18. A vehicle spring comprising a spring leaf arranged for connection to a vehicle chassis, a second spring member connected to said leaf, and elastic, non-metallic, shock absorbing and distributing material disposed between and engaging said leaf and said second member, said second spring member having a reentrant portion extending toward the spring leaf, for receiving the axle.

19. A spring comprising a pair of leaves rigidly connected at their ends, one leaf having a plurality of loops therein extending toward the other leaf, and elastic cushioning material disposed between the loops of one leaf and the other leaf.

20. A spring comprising a pair of leaves rigidly connected at their ends, one leaf having a plurality of loops therein extending toward the other leaf, and elastic cushioning material disposed in said loops and between the loops of one leaf and the other leaf.

21. A spring comprising a pair of leaves rigidly connected at their ends, one leaf having a plurality of loops therein on opposite sides of the center thereof, and elastic cushioning material disposed between the loops of one leaf and the other leaf.

22. A spring comprising a pair of leaves, one leaf having a plurality of loops therein, elastic cushioning material in said loops, and means rigidly connecting said leaves at their ends.

23. A vehicle spring comprising a spring leaf, a second spring leaf rigidly connected at its ends to the ends of said leaf, and elastic, non-metallic, shock absorbing and distributing material disposed between and engaging said leaves, one of said leaves having loops therein extending toward the other leaf.

EMIL ANDERSON.